United States Patent Office 2,779,751
Patented Jan. 29, 1957

2,779,751

POLYMERIZATION PROCESS USING SULFONE-CONTAINING ACCELERATORS

Hellmut Bredereck, Erich Bäder, Adolf Wohnhaas, and Wolfgang Nübling, Stuttgart, Germany, assignors to W. C. Heraeus G. m. b. H., Hanau (Main), Germany, a body corporate of Germany, and Deutsche Gold- und Silber-Scheideanstalt, vormals Roessler, Frankfurt am Main, Germany, a body corporate of Germany No Drawing. Application July 8, 1952,
Serial No. 297,758

Claims priority, application Germany July 10, 1951

10 Claims. (Cl. 260—89.5)

This invention relates to the manufacture of polymerisation products.

It has been known for a long time to polymerise unsaturated organic compounds, such as unsaturated hydrocarbons, vinyl compounds, acryl compounds, styrenes and allyl compounds. In order to lower the polymerization temperature and to increase the speed of polymerization, catalysts are employed in these polymerisation operations. It is generally known and customary to employ oxygen, air, inorganic and organic peroxy compounds.

French specification No. 883,679 describes a process for the production of plastics which are self-hardening at low temperatures, in which process the polymerisation of vinyl compounds, for example styrene, vinyl chloride, acrylic acid or methacrylic acid or their derivatives, singly or in admixture with one another, is carried out in the presence of compounds which are capable of forming labile amine oxides. As such, there are primarily proposed tertiary amines, for example, trialkyl amines, triaryl amines and triarylalkyl amines and also derivatives of hydrazine. These compounds containing nitrogen can be used alone or in the presence of the known polymerisation catalysts containing oxygen, more especially the inorganic or organic peroxides.

Numerous other proposals are directed to lowering the polymerization temperature and increasing the polymerisation speed by new and more complex polymerisation accelerators.

According to the present invention, the production of polymerisation products, more especially shaped bodies from polymerisable organic compounds containing a doubly linked and preferably terminal methylene group, more especially acrylic acid and methacrylic acid and their derivatives, using polymerisation accelerators which contain heavy metals of their compounds in catalytic quantities together with compounds which can be easily oxidised and sulphone derivatives.

The process according to the invention can be applied to various polymerisable organic compounds containing a doubly linked methylene group. In particular, the following substances can be used as substances to be polymerised: unsaturated hydrocarbons of aliphatic nature, for example butadiene, vinyl acetylene, or their derivatives, for example chlorbutadiene, or those of aromatic nature, for example styrene or divinyl benzene, derivatives of vinyl alcohol, for example vinyl chloride, vinyl acetate and other vinyl esters or vinyl ethers, acrylic acid or alkylacrylic acids, for example methacrylic acid or their derivatives, for example amines, nitriles, chlorides and other esters such as methyl methacrylate or ethers, allyl compounds such as diallyl diglycol carbonate or triallyl cyanurate. However, compounds can also be polymerised in which the methylene group is not disposed at the end of the chain as in those set forth, but is at another position, for example in the middle, for example crotonic acid and its derivatives.

As polymerisation accelerators in accordance with the invention, there may be employed various heavy metals, especially iron, cobalt, copper, manganese, lead and also the platinum metals. The new accelerators can be used both in metallic form and also in the form of their compounds, the salts being preferred. Inorganic salts, for example chlorides, can be used, but it is advantageous to use salts of organic acids, for example, the acetates, caproates, α-ethyl caproates, lactates, tartrates, acetonyl acetonates, stearates, palmitates, benzoates, naphthenates and also alcoholates.

With particular advantage, there are employed different accelerators, especially different metals, for example iron and copper or mixtures of compounds with metals, for example iron and copper benzoate or copper and iron benzoate or of different compounds, for example iron benzoate and copper benzoate.

The heavy metal catalysts are used in catalytic quantities, that is to say, in quantities of fractions of a gamma up to several hundred gamma, calculated as metal per gram of the substance to be polymerised. Quantities of a few mg. are not harmful, but larger quantities are not expedient because in this way polymerization products are obtained which either show an undesirable colouring from the outlet or become discoloured during storage. In general, there are employed quantities of 1–100 gamma of heavy metal per gram of the substance to be polymerised, for example 1–3 gamma of a mixture of iron and copper per cubic centimetre of monomeric liquid, corresponding to 1 to $3 \times 10^{-4}\%$.

In addition to these heavy metal accelerators, it is also possible to employ small quantities of oxides, hydroxides or salts of other metals having an activating effect on the heavy metals, for example, of the alkali or alkaline earth metals or of zinc. A mixture of iron benzoate, copper benzoate and zinc hydroxide or zinc carbonate has proved to be particularly suitable.

Surprisingly, insoluble salts of the heavy metals have also proved to be suitable as constituents of the new polymerisation accelerators. It is also to be noted that the hydroxides or carbonates, for example zinc hydroxide or zinc carbonate, which increase the efficacy, increase the activity despite the fact that they are practically insoluble.

The heavy metal accelerators are always used together with readily oxidisable compounds on the one hand and sulphone derivatives on the other hand.

Tertiary amines are preferably used as readily oxidisable compounds, but secondary amines can also be employed. As tertiary amines, there may be more particularly employed for example tributyl amine, trihexylamine, phenylethyldibutylamine, N-dimethyl-aniline, N-dimethyl-p-toluidine, N-diethyl-ethanolamine, bis-(dimethylaminophenyl)-methane (hydrated Michler's ketone).

Diphenylamine can be mentioned as an example of a secondary amine.

However, instead of the amines, it is also possible to use other readily oxidisable substances which are compounds with labile hydrogen atoms, such as triphenylmethane, tri-diphenylmethane or hydroquinone.

The third component of the accelerators according to the invention is a sulphone derivative, that is to say, a substance with a $SO_2$ group in the molecule, for example compounds according to co-pending application No. 237,307, filed July 17, 1951.

Instead of using substances which are separately readily oxidisable, for example amines on the one hand and sulphone derivatives on the other hand, it is possible with particular advantage to employ compounds which include amino groups and also SO₂ groups in their molecule, for example, sulphonalkyl amines or alkanolamines, in which at least 1 or 2 hydrogen atoms on the nitrogen are substituted by a radical of the general formula R—SO₂—CHR'—, in which R is a hydrocarbon radical and R' is hydrogen or a hydrocarbon radical which may be substituted. It is therefore a question of compounds, the use of which has been claimed per se in specification No. 237,307. It is frequently advantageous to employ the compounds of this specification in addition to tertiary amines. These compounds are prepared from the sulphocarbinols according to the Meyer process (Journ. für praktische Chemie, vol. 63, page 167 (1901)).

In application Serial No. 237,307, sulfone derivatives of the general formula

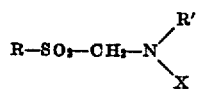

are disclosed. According to this formula R is an alkyl, alkyl aryl, or aryl radical, R' is H, R, or an alkanol radical, and X is H, an alkyl radical or the group

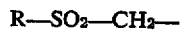

While the use of heavy metals or their compounds and of readily oxidisable compounds, especially amines and sulphone derivatives or compounds which contain both amino groups and sulphone groups at the same time, is essential according to the invention, it is also possible to use as well other substances which assist or accelerate the polymerisation.

Stabilisers can be used for preventing premature polymerisation, for example hydroquinone or secondary amines. These compounds can thus be introduced with a double function, namely as readily oxidisable substances and also as stabilisers.

The addition of alcohols according to co-pending application No. 274,821, filed March 4, 1952, is very favourable. As such there may be mentioned lower alcohols, such as methanol, ethanol, propanol and isopropanol. The alcohols are added in quantities of 1–20%, preferably 2–5%.

Instead of or with the alcohols, it is also possible to use carbonyl compounds, preferably aldehydes, for example lower aliphatic aldehydes, such as propionaldehyde or butyric aldehyde. The carbonyl compounds are added in quantities of 0.1–10%, especially 0.5–3%.

The main advantages of the new acceleration systems consist in that it is possible to work without peroxides, that is to say, it is possible to exclude completely the discoloration of the final products which can only be avoided with very great difficulty when using peroxides. However, it is also possible to use small quantities of peroxy compounds or other known oxygen-containing catalysts, such as oxygen, air, inorganic peroxy compounds, such as hydrogen peroxide or potassium persulphate, or organic peroxy compounds, for example dibenzoyl peroxide, oxyheptyl peroxide, p-chlorbenzoyl peroxide, cyclohexanone peroxide, tertiary butyl permaleic acid, tertiary butyl perphthalic acid or di-tertiary-butyl di-perphthalate.

The accelerator system according to the invention is characterised by its exceptional efficiency. When using it, the polymerisation is complete even at room temperature in 6 to 8 minutes and in the most favourable cases in 3 to 4 minutes, while the polymerisation period with moderate heating, for example to 35° C. is even shorter.

Various known polymerisation processes, for example block polymerisation or polymerisation in solution, emulsion or suspension can be used. Accordingly, the monomeric compound to be polymerised is used as such or in the form of its solution in suitable solvents or in the form of an emulsion.

In many cases, it is advisable to carry out the polymerisation in the presence of already polymerised portions of the compound to be polymerised. In this case, mixtures of powdered polymers with liquid or dissolved monomers or liquid or dissolved partially polymerised compounds can be employed. The liquid components of the mixture to be polymerised can also be the solution of another substance of high molecular weight in the monomeric compound.

In this case, the solid polymer conveniently contains the sulphone derivative and if desired the metal salt and, but not necessarily, the peroxide. The liquid portion on the contrary, contains mainly the metal salts and the amine, where the solid polymer does not already include a compound which comprises both an amino group and a sulphone group.

Examples of such batches which show the effectiveness of the new acceleration systems are as follows:

1. A powder of solid methyl methacrylate polymer, which before production contains at the most only a few tenths of a per cent of benzoyl peroxide, with an addition of 1.5% N-methyl-di-p-tolyl sulphone methylamine of the formula $$(CH_3—C_6H_4—SO_2—CH_2)_2—N—CH_3$$

and liquid monomeric or initially polymerised methyl methacrylate, which contains 1.9 gamma of copper per cubic centimetre of liquid as copper benzoate, 0.3% of diphenylamine, 2.5% of methanol and 0.06% of hydroquinone. With the addition of the solid polymer to the liquid monomeric compound, the polymerisation of the mixture commences at room temperature and is completed without supplementary heating after 6 to 8 minutes.

2. The same polymerisation times are maintained when, in Example 1, the copper is added as copper acetonyl acetonate to the monomeric or initially polymerised methacrylic acid ester.

3. If the diphenylamine in Example 1 is replaced by 0.5% of bis-(dimethylaminophenyl)-methane (hydrated Michler's ketone), the same polymerisation times are likewise maintained.

4. A solid methyl methacrylate polymer with 1–2% N-methyl-di-p-tolylsulphone methylamine and if desired 0.6% of benzoyl peroxide and liquid monomeric or initially polymerised methyl methacrylate, which contains 1.9 gamma of copper per cubic centimetre of liquid as copper benzoate, 0.7% of dimethyl-p-toluidine, 2.5% of methanol and 0.06% of hydroquinone is used. With the addition of the solid polymer to the liquid monomeric compound, the polymerisation of the mixture commences at room temperature and this polymerisation is completed after 6 to 8 minutes without supplementary heating.

5. A solid methyl methacrylate polymer, which contains catalytic quantities of technical zinc hydroxide, zinc carbonate, copper hydroxide and copper carbonate, with 1–2% N-methyl-di-p-tolyl-sulphone-methylamine of the formula $(CH_3.C_6H_4.SO_2CH_2)_2N.CH_3$ and if desired 0.6% benzyl peroxide and liquid monomeric or initially polymerised methyl methacrylate, which includes 0.06% of hydroquinone is used. Upon addition of the solid polymer to the liquid monomeric compound, the polymerisation of the mixture commences at room temperature, such polymerisation being completed after three to four minutes without supplementary heating.

The polymerisation products obtained according to the process of the invention can be used in various fields and for all kinds of different purposes. According to the purpose of use, different additional substances will be admixed before, during or after the polymerisation. For this purpose, there may be used fillers, such as carbon black, highly dispersed metal oxides, such as zinc oxide, silicon dioxide, aluminium oxide and other very finely dispersed or surface-active substances, vulcanising agents, such as sulphur, mercaptobenzthiazoles, or hexamethylene tetramine, vulcanisation accelerators, dyestuffs, pigments, loading agents, air-drying oils, plasticisers, stabilisers and capillary-active substances. The process according to the invention is not detrimentally affected by the presence of inhibitors, such as hydroquinone or ascorbic acid.

The process has proved itself in the varnish industry, adhesive industry and paint industry. With a syrupy varnish which is to be polymerised in accordance with the invention and which consists of a solution of the polymer in the monomer with addition of polymerisation catalysts, the film which is formed upon coating or spraying on a surface will set very rapidly and harden thoroughly, since the liquid portion is not only a solvent which evaporates but itself polymerises to a major degree.

The process according to the invention is also suitable for the production of filler masses and impregnating masses for materials of all kinds, for example fabrics, more especially textiles, crack-sealing masses and pore fillers, for the production of bodies or coverings which are resistant to corrosive to atmospheric influences, for electric insulations of all kinds, heat and sound damping materials, modelling and impression masses.

Furthermore, according to the invention shaped bodies of different types and different properties can be produced with a character ranging from rubber to glass. The glass-like polymerisation products are of such perfection and density that they can be considered as almost perfect. Even with considerable thickness and comparatively high strength, they present conchoidal fraction surfaces of exceptional hardness which have a glass-like glaze and are free from pores.

Since the new polymerisation products are free from pores and tension, they can be used with particular advantage for the production of articles in which optical clarity or transparency is essential, such as safety glass, protective filters, spectacle glasses and the like.

The shaped bodies according to the invention can be produced in any desired forms, such as filaments, films, tubes, sheaths, spheres and members of complicated structure.

The polymerisation products are of particular importance in dentistry for the production of protheses, artificial teeth, tooth and root fillings. For this purpose moulded bodies of plastics have already been produced for many years by the polymerisation being carried out in the mould which has the shape of the required moulded member. This process is preferably so carried out that the monomeric or only partially polymerised liquid is introduced into the mould in admixture with a polymer which is preferably in powder form and especially that which corresponds to the compound to be polymerised and is initially polymerised in this mould to the final moulded body. By the addition of the polymer, the contraction in volume during the final polymerisation is reduced and thus a moulded body true to shape is obtained. The nature of the mixture to be introduced into the mould can vary within wide limits depending on the mixture proportion between powder and liquid and the supplementary substances which are also used, in that for example masses of the nature of viscous liquids or doughy mixtures or mixtures which are to be considered as moistened powder are used.

By the use of the process according to the invention in this field, the polymerisation can be carried out at such low temperatures and at such a speed that the dental work can be executed in the mouth itself.

In carrying the process according to the invention into effect for this purpose, it is advantageous to use polymerisation batches which consist, on the one hand, of the liquid or dissolved monomeric or partially polymerised compound to be polymerised and on the other hand, of a preferably powdered polymer, which are stored separately until the polymerisation takes place.

By using such batches, it is for example possible to manufacture gum plates, base plates, spare parts for dentures, gum shields, bridges, crowns, teeth and tooth and root fillings.

In a similar manner the process according to the invention can be used in other prothetic fields, for example, in the manufacture of artificial eyes, facial plastic surgery, artificial limbs and the like.

What we claim is:

1. Process for the production of polymerization products which comprises polymerizing a polymerizable organic compound containing a methylene group double-linked to a carbon atom in the presence of a polymerization accelerator comprising a metal component selected from the group consisting of multi-valent heavy metals and salts thereof, and a sulfone methyl-amine having the general formula

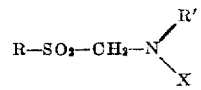

in which R is a member selected from the group consisting of alkyl, alkyl aryl, and aryl radicals, R' is a member selected from the group consisting of H, R, and alkanol radicals, and X is a member selected from the group consisting of H, alkyl radicals, and the group —$CH_2$—$SO_2$—R, and recovering a polymerization product.

2. Process according to claim 1, in which said polymerization accelerator additionally contains a member selected from the group consisting of triphenylmethane, tri-(diphenyl) methane, tributyl amine, trihexyl-amine, phenylethyl-dibutylamine, N-dimethyl-aniline, N-dimethyl-p-toluidine, N-diethyl-ethanolamine, bis-(dimethylaminophenyl)-methane, diphenylamine and hydroquinone.

3. Process according to claim 1, in which said metal component is a metal of the iron group.

4. Process according to claim 1, in which said metal component is a salt of a metal of the iron group.

5. Process according to claim 1, in which said metal component is iron and copper.

6. Process according to claim 1, in which said metal component is a salt of iron and a salt of copper.

7. Process according to claim 1, in which said polymerization accelerator includes an alcohol.

8. Process according to claim 1, in which said polymerization accelerator includes a compound containing a carbonyl group.

9. Process according to claim 1, in which said metal component is present in amounts of a fraction of a gamma to several hundred gamma calculated as metal per gram of said polymerizable organic compound.

10. Process according to claim 1, in which said polymerizable organic compound is methyl methacrylate in the form of a mixture of the monomer and polymer thereof, and in which said metal component is a copper salt, and in which said polymerization accelerator includes an alcohol and hydroquinone.

References Cited in the file of this patent

UNITED STATES PATENTS

| | | |
|---|---|---|
| 2,380,475 | Stewart | July 31, 1945 |
| 2,480,928 | Hurdis | Sept. 6, 1949 |
| 2,527,393 | Brown | Oct. 24, 1950 |
| 2,558,139 | Knock et al. | June 26, 1951 |
| 2,566,821 | Brown et al. | Sept. 4, 1951 |
| 2,584,306 | Theobald | Feb. 5, 1952 |

FOREIGN PATENTS

| | | |
|---|---|---|
| 883,679 | France | Mar. 29, 1943 |

UNITED STATES PATENT OFFICE

CERTIFICATE OF CORRECTION

Patent No. 2,779,751                  January 29, 1957

Hellmut Bredereck et al.

It is hereby certified that error appears in the printed specification of the above numbered patent requiring correction and that the said Letters Patent should read as corrected below.

Column 1, line 52, for "metals of" read -- metals or --; column 4, line 57, for "benzyl" read -- benzoyl --.

Signed and sealed this 20th day of August 1957.

(SEAL)
Attest:

KARL H. AXLINE                      ROBERT C. WATSON
Attesting Officer                Commissioner of Patents